Figure 1:
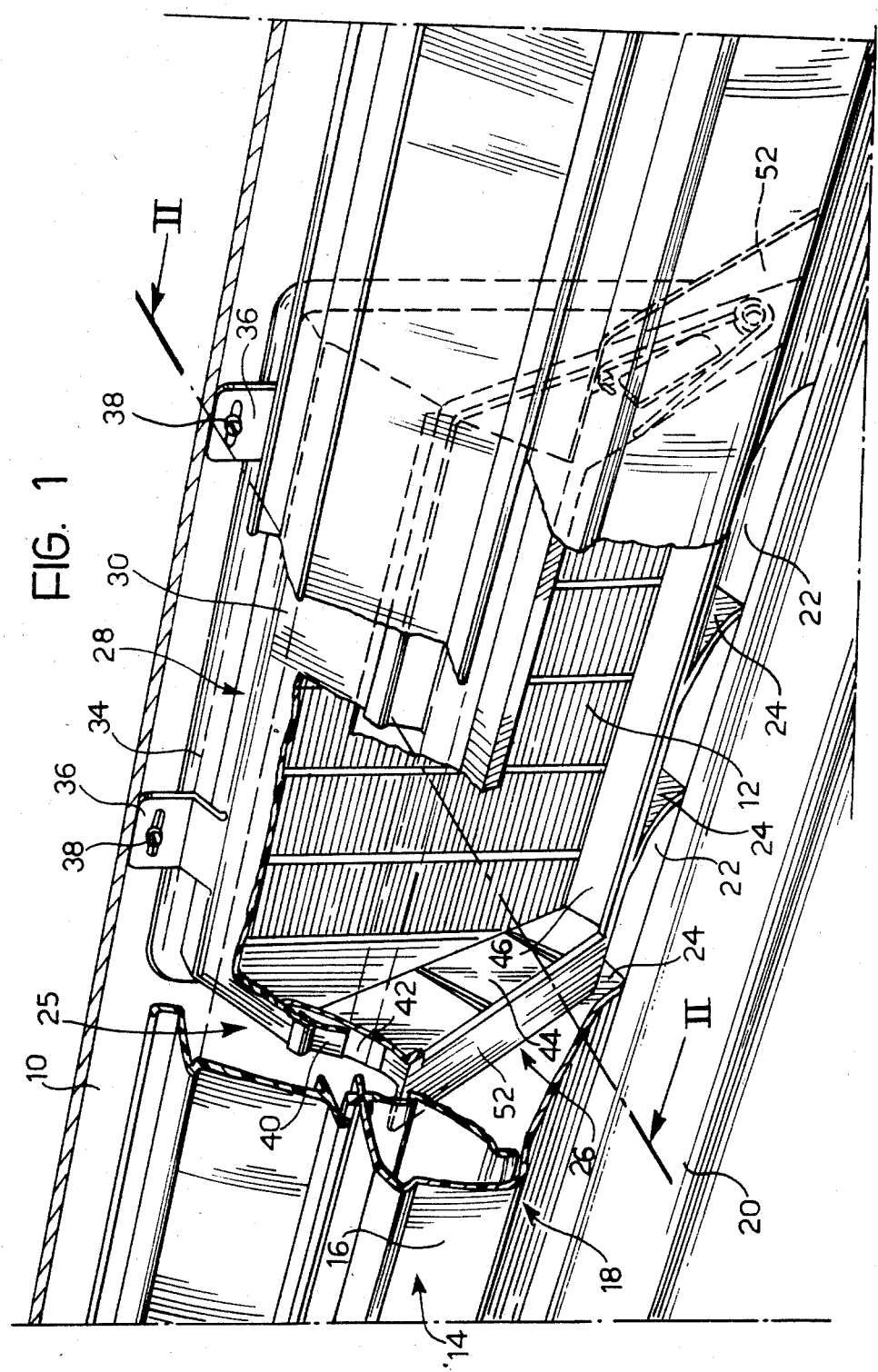

United States Patent [19]

Baravalle

[11] Patent Number: 4,567,955
[45] Date of Patent: Feb. 4, 1986

[54] MOTOR VEHICLE HAVING A CONVEYOR FOR AIR FOR COOLING THE RADIATOR FOR THE ENGINE COOLANT LIQUID

[75] Inventor: Michele Baravalle, Poirino, Italy

[73] Assignee: Fiat Auto S.p.A., Turin, Italy

[21] Appl. No.: 645,995

[22] Filed: Aug. 30, 1984

[30] Foreign Application Priority Data

Sep. 7, 1983 [IT] Italy .................. 67930 A/83

[51] Int. Cl.⁴ .................. B60K 11/08; B60R 19/08
[52] U.S. Cl. .................. 180/68.1; 293/113; 293/117
[58] Field of Search .................. 180/68.1, 68.2, 68.3, 180/68.6; 293/113, 117; 165/44

[56] References Cited

U.S. PATENT DOCUMENTS

| | | | |
|---|---|---|---|
| 2,193,229 | 3/1940 | Exner | 293/113 |
| 2,260,578 | 10/1941 | Murray | 180/68.1 |
| 2,329,874 | 9/1943 | Cadwallder | 180/68.1 X |
| 2,759,755 | 8/1956 | Johnson | 293/113 |
| 3,506,082 | 4/1970 | Cadiou | 180/68.1 |

FOREIGN PATENT DOCUMENTS 2058921 4/1981 United Kingdom .............. 180/68.1

Primary Examiner—Robert G. Nilson
Attorney, Agent, or Firm—Bert J. Lewen; Henry Sternberg

[57] ABSTRACT

A motor vehicle has a radiator for the liquid of the engine cooling circuit supported by the front part of the motor vehicle bodywork, and a conveyor for air for cooling the radiator having a part which is movable resiliently towards the front part of the bodywork in the case of a frontal collision of the vehicle.

5 Claims, 3 Drawing Figures

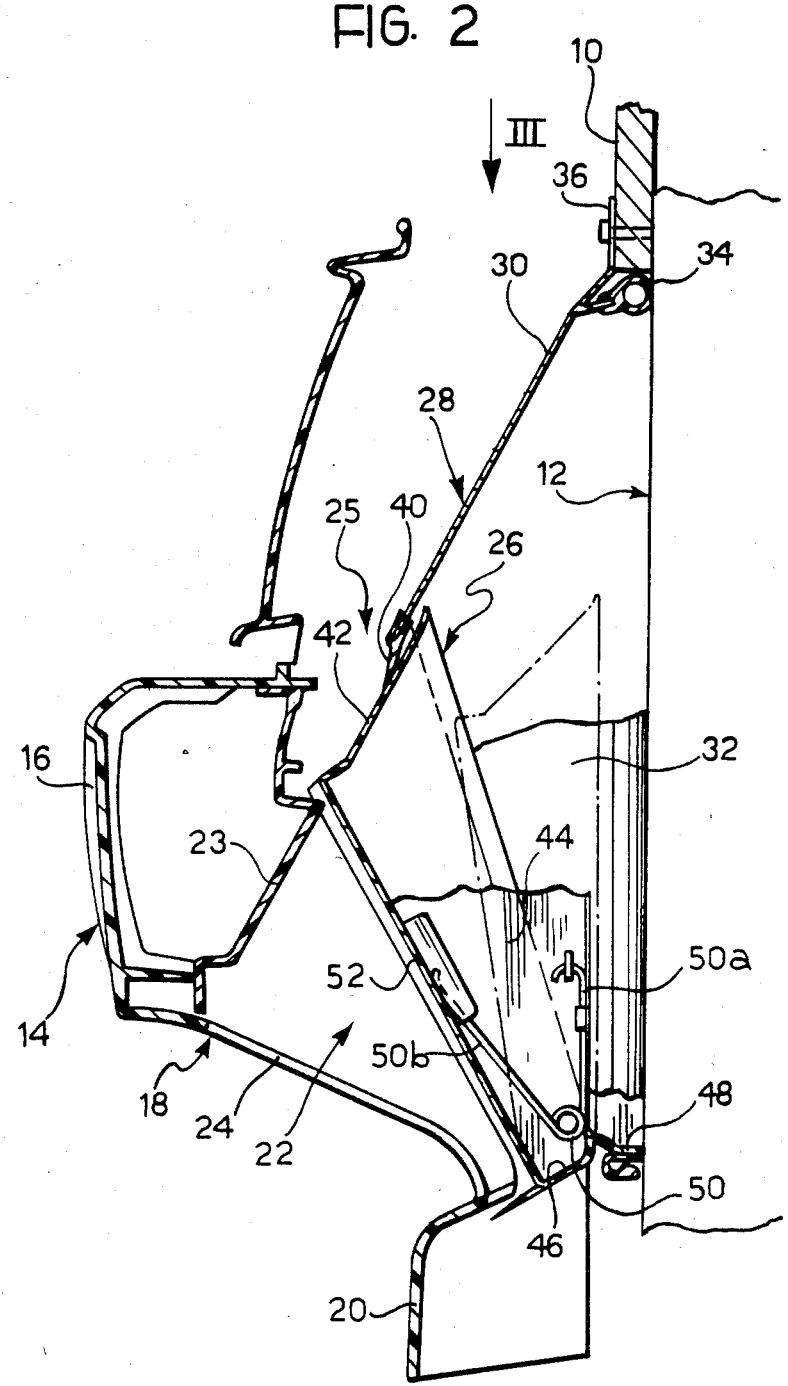

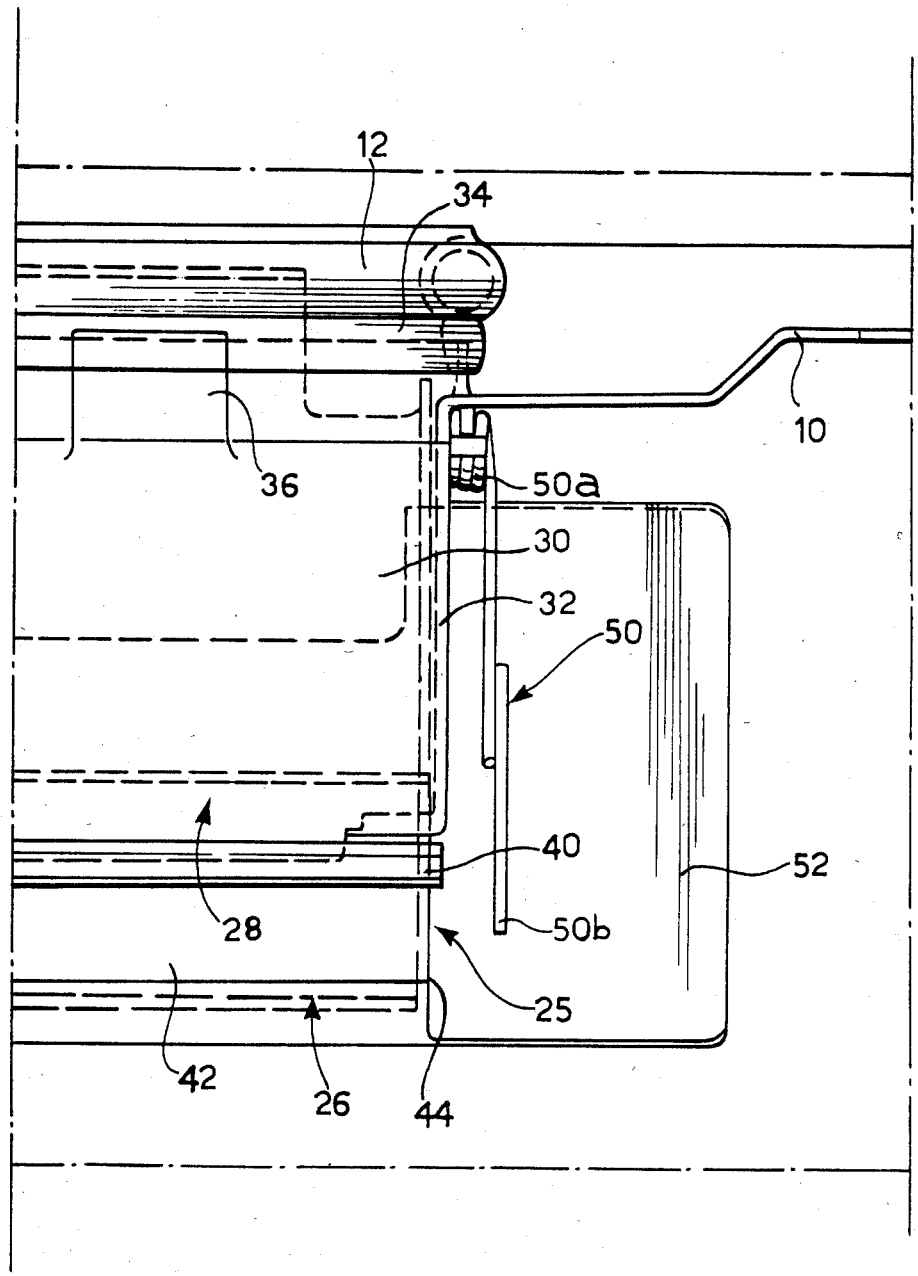

MOTOR VEHICLE HAVING A CONVEYOR FOR AIR FOR COOLING THE RADIATOR FOR THE ENGINE COOLANT LIQUID

The present invention relates to motor vehicles having a front bodywork part, a front bumper, a radiator for the liquid of the engine cooling circuit supported by the front bodywork part, and a conveyor for air for cooling the radiator located in front of the front bodywork part.

The object of the present invention is to provide a motor vehicle of the type defined above having an arrangement such as to ensure efficient cooling of the radiator for the liquid of the cooling circuit and, particularly, in which the effectiveness of the conveyor for the cooling air for the radiator is not compromised as a result of micro frontal collisions of the vehicle.

According to the invention, this object is achieved by virtue of the fact that the conveyor for the air for cooling the radiator has a movable part which can be moved resiliently towards the front bodywork part by a thrust exerted in this direction by the front bumper.

By virtue of this characteristic, the resilient deformation of the front bumper in the case of a minor frontal collision of the vehicle causes a resilient collapse of the air conveyor, avoiding the latter becoming damaged and hence having to be replaced. After the return of the front bumper to the underformed rest condition after the collision, the effectiveness of the air conveyor is restored automatically as a result of the return of the movable part of its initial position without the need for external intervention.

According to the invention, the air conveyor includes a front section formed integrally with the front bumper, a rear section rigid with the front bodywork part in correspondence with the radiator, and an intermediate section articulated at its lower part about a substantially horizontal axis so as to be rotatable between a normal position in which it bears against the front section and connects this to the rear section, and a position within the rear section, resilient opposing means being provided for urging the intermediate section in its normal position.

The invention will now be described in detail with reference to the appended drawings, provided purely by way of non-limiting example, in which:

FIG. 1 is a schematic, partially-sectioned perspective view of part of a motor vehicle according to the invention, FIG. 2 is a vertical section taken on the line II—II of FIG. 1, and FIG. 3 is a plan view from above taken on arrow III of FIG. 2.

In the drawings, the front bodywork part of a motor vehicle according to the invention is schematically indicated 10 and in correspondence therewith is fixed a radiator 12 of conventional type connected to the circuit for the coolant liquid of the vehicle engine, not shown in the drawings.

The front bumper 14 of the vehicle extends horizontally in front of the front bodywork part 10 at the level of the lower zone of the radiator 12.

The bumper 14 is of moulded plastics material and has a shape such as to allow it absorb the energy of minor frontal collisions of the vehicle resiliently.

In the embodiment illustrated, the bumper 14 has an upper part 16 projecting forwardly and defining the impact surface of the bumper, an intermediate part 18 inclined downwardly and being rentrant towards the front bodywork part 10, and a lower part 20 constituting a deflector or spoiler which is connected to the intermediate part 18.

The portion of the intermediate part 18 facing the radiator 12 has a series of apertures 22 separated by transverse partitions 24 and surmounted by an inner inclined wall 23, and constituted the front section of a conveyor 25 for air for cooling the radiator 12.

The air conveyor 25, in addition to the part 18 of the bumper 14 having the apertures 22 which act in practice as air intakes, includes a movable intermediate section 26 and rear section 28 fixed to the front bodywork 10.

The rear section 28 includes an upper wall 30 inclined downwardly towards the bumper 14 and two downwardly tapering vertical side walls 32, which surround the outline of the radiator 12 with the interposition of a gasket 34 of soft material.

The upper wall 30 has two upper rear fixing lugs 36 connected to the front bodywork part 10, for example by screws 38, and a flexible blade 40 at its front in sliding contact with the intermediate section 26.

This section 26 includes an upper wall 42 which extends as an elongation of the upper wall 30 of the rear section 28 beneath the flexible blade 40, two side walls 44 disposed as elongation of the side walls 32 and inwardly thereof, and a base wall 46 which connects the base of the radiator 12 to the base of the part 18 of the bumper 14 having the apertures 22.

The intermediate section 26 is connected to the structure of the vehicle by means of resilient rear tabs 48 projecting rearwardly from the base wall 46 and fixed to the front bodywork part 10 beneath the radiator 12.

This connection allows the intermediate section 26 to rotate about a horizontal axis parallel to the bumper 14 between a normal position illustrated in continuous outline in FIGS. 1 and 2, in which its upper part bears against the inner wall 23 of the bumper 14, and a retracted position shown in broken outline in FIG. 2, in which it is inserted within the rear section 28 adjacent the radiator 12.

The intermediate section 26 is urged towards its normal position by a pair of pin-springs one of which is indicated 50 in the drawings, each of which has an arm 50a fixed to the front bodywork part 10 and/or to one of the side walls 32 of the rear section 28 and an arm 50b which bears resiliently against a front bearing flange 52 projecting laterally from the corresponding side wall 44 of the intermediate section 26.

During travel of the vehicle, the radiator 12 is effectively cooled by the air flow which enters through the apertures 22 and is conveyed by the walls 23, 24, the intermediate section 26, and the rear section 28 against the front surface of the radiator itself.

In the case of a minor frontal collision of the vehicle, the resilient deformation of the bumper 14 causes the movement of the intermediate section 26 from its normal position to its retracted position against the reaction of the springs 50. Immediately the effect of the collision has ceased, the intermediate section 26 is returned to its initial position, automatically restoring the effectiveness of the conveyor 25.

Naturally, the constructional details and the embodiments may be varied widely with respect to that described and illustrated without thereby departing from the scope of the present invention.

Thus, for example, the two pin-springs 50 could be replaced by equivalent resilient systems, such as, for example, one or more flat springs applied to the upper wall 30 of the rear section 28 and acting against the intermediate section 26.

I claim:

1. Motor vehicle having an engine, a liquid cooling circuit for the engine, a front bodywork part, a front bumper located in front of the front bodywork part, a radiator for the liquid of the engine cooling circuit supported by the front bodywork part, a conduit for conveying air for cooling the radiator located in front of the front bodywork part, wherein the cooling air conveyor includes a front section formed integrally with the front bumper, a rear section rigid with the front bodywork part in correspondence with the radiator, and an intermediate section articulated at its lower part to the front bodywork part about a substantially horizontal axis so as to be rotatable between a normal position in which said intermediate section bears against the front section and provides an air-flow connection between said front section and said rear section, and a retracted position within the rear section, resilient opposing means being provided for restraining the intermediate section in its normal position.

2. Motor vehicle according to claim 1, wherein
the front bumper is provided with upper and lower conveyor surfaces, and the front section is formed by a portion of the front bumper acting as an air intake,
the rear section includes an upper wall and two side walls projecting towards the front bumper, and
the intermediate section includes an upper wall and two side walls which extend between the upper wall and the side walls of the rear section and the front section, and a base wall which extends between the radiator and the front section and is provided with connecting elements articulated to the front bodywork part.

3. Motor vehicle according to claim 2, wherein the articulated connecting members include flexible blades projecting rearwardly of the base wall and connected to the front bodywork part.

4. Motor vehicle according to claim 2, wherein the resilient opposing means include a pair of torsion springs located at the side of the intermediate section and acting at one end against the front bodywork part and at the opposite end against front bearing flanges of the side walls of the intermediate section.

5. Motor vehicle having an engine, a liquid-cooling system for the engine, a front body portion, a front bumper located in front of the front body portion, a radiator for the liquid of the engine-cooling system supported by said front body portion, a conduit means for conveying air for cooling the radiator, said conduit means located in front of the front body portion and said conduit means including a moveable member, means for supporting said moveable member for swivel movement thereof toward and away from said front body portion and means for resiliently urging said moveable member in a direction to swivel it away from said front body portion and toward said front bumper, whereby said moveable member is resiliently swivelable in opposition to said urging means, toward said front body portion in response to a thrust exerted in this direction by the front bumper.

* * * * *